US012608054B2

(12) United States Patent
Wang et al.

(10) Patent No.: US 12,608,054 B2
(45) Date of Patent: Apr. 21, 2026

(54) LAPTOP COMPUTER

(71) Applicant: Acer Incorporated, New Taipei City (TW)

(72) Inventors: Yu-Shih Wang, New Taipei City (TW); Wen-Chieh Tai, New Taipei City (TW); Chih-Chun Liu, New Taipei City (TW); Dong-Sheng Wu, New Taipei City (TW); Tzu-Wei Lin, New Taipei City (TW); Yi-Mu Chang, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 233 days.

(21) Appl. No.: 18/623,067

(22) Filed: Apr. 1, 2024

(65) Prior Publication Data

US 2025/0138594 A1      May 1, 2025

(30) Foreign Application Priority Data

Oct. 27, 2023    (TW) .................................. 112141301

(51) Int. Cl.
  *G06F 1/16*        (2006.01)
  *G06F 1/18*        (2006.01)
  *G06F 1/183*       (2026.01)

(52) U.S. Cl.
  CPC .......... *G06F 1/1683* (2013.01); *G06F 1/1656* (2013.01); *G06F 1/1658* (2013.01); *G06F 1/1688* (2013.01); *G06F 1/183* (2013.01); *G06F 1/1616* (2013.01)

(58) Field of Classification Search
  CPC .... G06F 1/1683; G06F 1/1656; G06F 1/1658; G06F 1/183; G06F 1/1688
  See application file for complete search history.

(56) References Cited

U.S. PATENT DOCUMENTS 5,237,486 A  *  8/1993  LaPointe ................. G06F 1/203
                                                      361/728
5,581,443 A  *  12/1996  Nakamura ............ H01L 23/585
                                                      257/E23.09
7,147,484 B1 *  12/2006  Kobayashi ............. H05K 1/144
                                                      439/74
2006/0023406 A1*  2/2006  Shih ...................... G06F 1/1616
                                                      361/679.55
2007/0281510 A1*  12/2007  Lin ........................ G06F 1/184
                                                      439/74

(Continued)

FOREIGN PATENT DOCUMENTS

CN          2470884        1/2002
CN          204155173      2/2015
(Continued)

Primary Examiner — Nidhi Thaker
(74) Attorney, Agent, or Firm — JCIPRNET

(57) ABSTRACT

A laptop computer including a casing, an inner frame, and a plurality of electronic modules is provided. The inner frame is detachably assembled to the casing and forms a plurality of receiving zones separated from each other. The electronic modules are respectively disposed in the receiving zones and connected to each other via a plurality of flexible electrical conducting members, and the electrical conducting members pass through a recess structure of the inner frame.

14 Claims, 15 Drawing Sheets

(56)                    References Cited

U.S. PATENT DOCUMENTS

| 2008/0014787 | A1* | 1/2008 | Kim | G06F 1/1686 |
| | | | | 439/517 |
| 2014/0192468 | A1 | 7/2014 | Kotaka et al. | |
| 2018/0166809 | A1* | 6/2018 | Brogan | H01R 13/2407 |

FOREIGN PATENT DOCUMENTS

| EP | 1621966 | 2/2006 |
| TW | 467304 | 12/2001 |
| TW | 577575 | 2/2004 |
| TW | I604298 | 11/2017 |
| TW | I718465 | 2/2021 |

* cited by examiner $190 \begin{cases} 191 \\ 192 \end{cases}$

132a

165

131a

164

160

161

163

112

Z
X
Y

141a

141

181

183

180

182

120

161

120

121

162e

162c

162c

181

183

161

182

LAPTOP COMPUTER

CROSS-REFERENCE TO RELATED APPLICATION

This application claims the priority benefit of Taiwan application serial no. 112141301, filed on Oct. 27, 2023. The entirety of the above-mentioned patent application is hereby incorporated by reference herein and made a part of this specification.

BACKGROUND OF THE INVENTION

Field of the Invention

The invention relates to a laptop computer.

Description of Related Art

ESG is the abbreviation of three English words, namely Environment, Social, and Governance. The United Nations Global Compact first proposed the concept of ESG in 2004, and it is regarded as an indicator for evaluating a company's operations. ESG is a measure of a company's sustainable development indicators, which are the carbon reduction and sustainable development goals required by international and domestic governments. In the past, business operations only needed to pay attention to financial data. However, even if the financial reports were promising, if the operations violated human rights, discharged wastewater, infringed on the rights of consumers, and harmed the living environment of the Earth's creatures, the international goal of promoting Earth sustainability was violated, prompting institutional investors to reduce investment and cooperation in such companies, and even affecting the company's reputation. Today, companies that value the ESG concept not only have transparent financial reports, but also have stable, low-risk operating models, and their long-term performance is also relatively stable. For the above reasons, for the electronics manufacturing industry, whether the products manufactured thereby may meet the above conditions has become one of the product evaluation conditions.

Taking laptop computers as an example, the evaluation content thereof is based on the amount of energy consumed in the manufacturing process of the product and whether the product has the ability to be repaired (renewed). In order to achieve the above goals, the member design and assembly configuration of laptop computers require corresponding new techniques and measures.

In terms of assembly and configuration, the assembly process of existing laptop computers includes the positioning and buckling of tenons or hooks, the welding of members or electronic elements, screw locking and fixing, and the docking of related electrical conducting members (connectors, cables, or wires, FPC) . . . etc. In addition to the high complexity of the process, related accessories and consumables often do not meet sustainability conditions. Especially for subsequent maintenance and disassembly, the relevant connection ports or connectors of the members are readily covered due to stacking, making it unlikely for the operator to readily disassemble and assemble the members. At the same time, the electrical connection relationship between members also needs to be considered. Due to the complexity of electrical conducting members between existing electronic members, during the assembly process of the members, in addition to performing wire management operations, the operator also needs to worry about accidents such as misconnection of connectors. In addition, after the assembly is completed, there may be situations such as members being separated due to vibration or falling, etc., or the electrical conducting members falling off.

Based on the above, based on the configuration and connection relationship of existing electronic members in laptop computers, sustainability goals are not readily met.

SUMMARY OF THE INVENTION

The invention provides a laptop computer having a modular architecture so as to better simplify the disassembly and assembly process while maintaining the combination relationship of members, and is also conducive to automated mechanical assembly and allows the laptop computer to meet sustainability conditions.

A laptop computer of the invention includes a casing, an inner frame, and a plurality of electronic modules. The inner frame is assembled to the casing and forms a plurality of receiving zones. The electronic modules are respectively disposed in the receiving zones and connected to each other via a plurality of flexible electrical conducting members, and the electrical conducting members pass through a recess structure of the inner frame.

Based on the above, in order to effectively simplify and modularize the laptop computer architecture, the plurality of receiving zones may be formed in the laptop computer via the assembly and combination of the casing and the inner frame, allowing the electronic modules to be assembled correspondingly in specific receiving zones to simplify the disassembly and assembly process. That is, the disassembly and assembly process of the laptop computer may be intuitive, which is conducive to the disassembly and assembly of the laptop computer by automated equipment or users.

Simply put, the receiving zones formed by the inner frame and the casing are substantially separated from each other, which is conducive to completing the electrical connection effect during the assembly process of the members, and thus avoiding the issue that the existing stacked assembly readily causes members to be overlapped with each other and connectors or locking members to be blocked and making smooth disassembly and assembly unlikely.

Furthermore, the inner frame has a recessed structure to facilitate the storage of flexible electrical conducting members and provide different electronic modules of different receiving zones to be electrically connected to each other via the electrical conducting members. In other words, in addition to the structural assembly and electrical assembly being completed at the same time, the laptop computer of the invention also uses the inner frame as an electrical connection channel for use by electronic modules of different receiving zones. Therefore, in addition to achieving the simplification and modularization of the above architecture, the architecture may also be effectively made more compact to facilitate the elimination of undesired redundant space.

DESCRIPTION OF THE EMBODIMENTS

Figure 1:
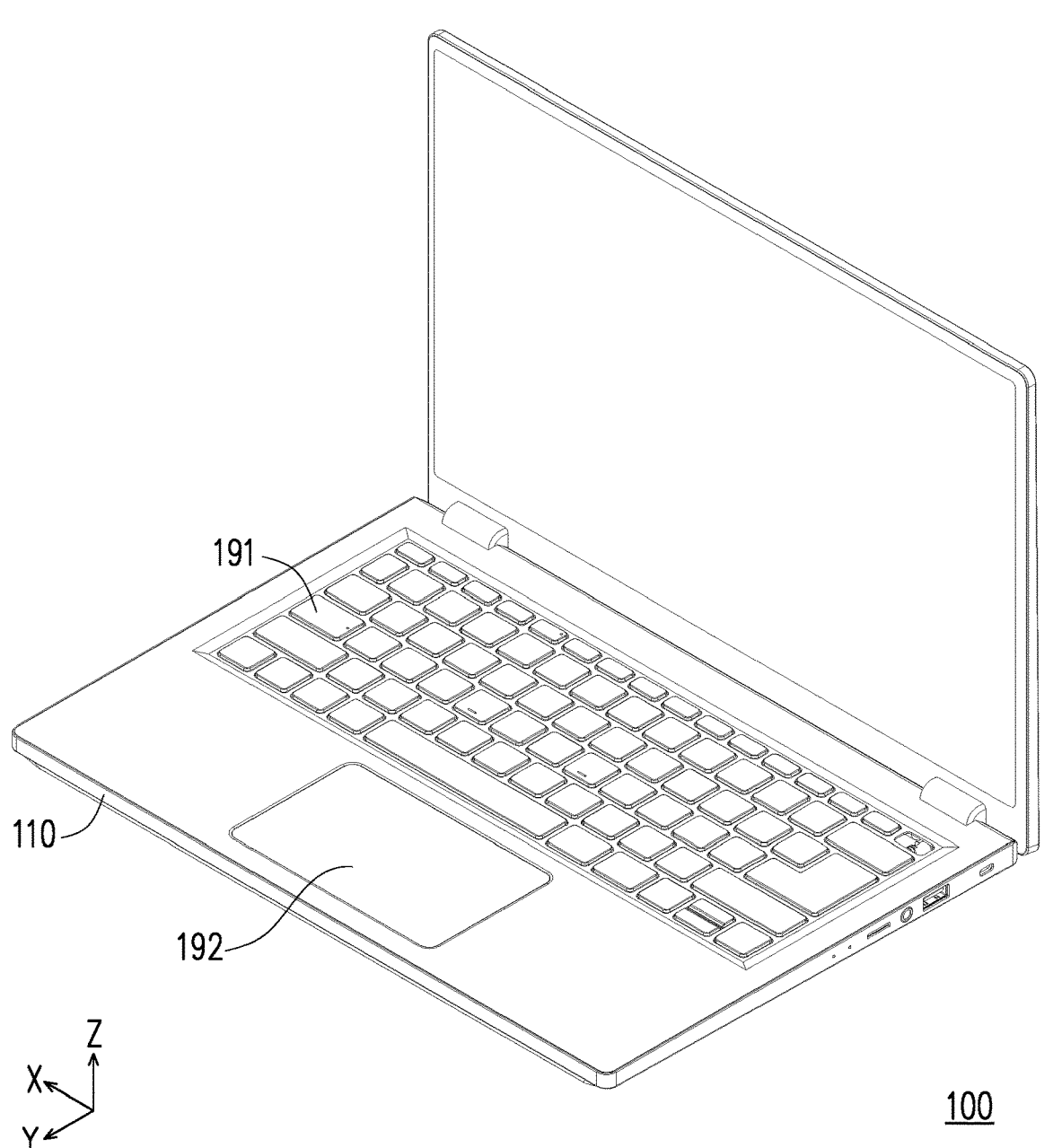
FIG. 1 is a flowchart of a laptop computer according to an embodiment of the invention.
Figure 2:
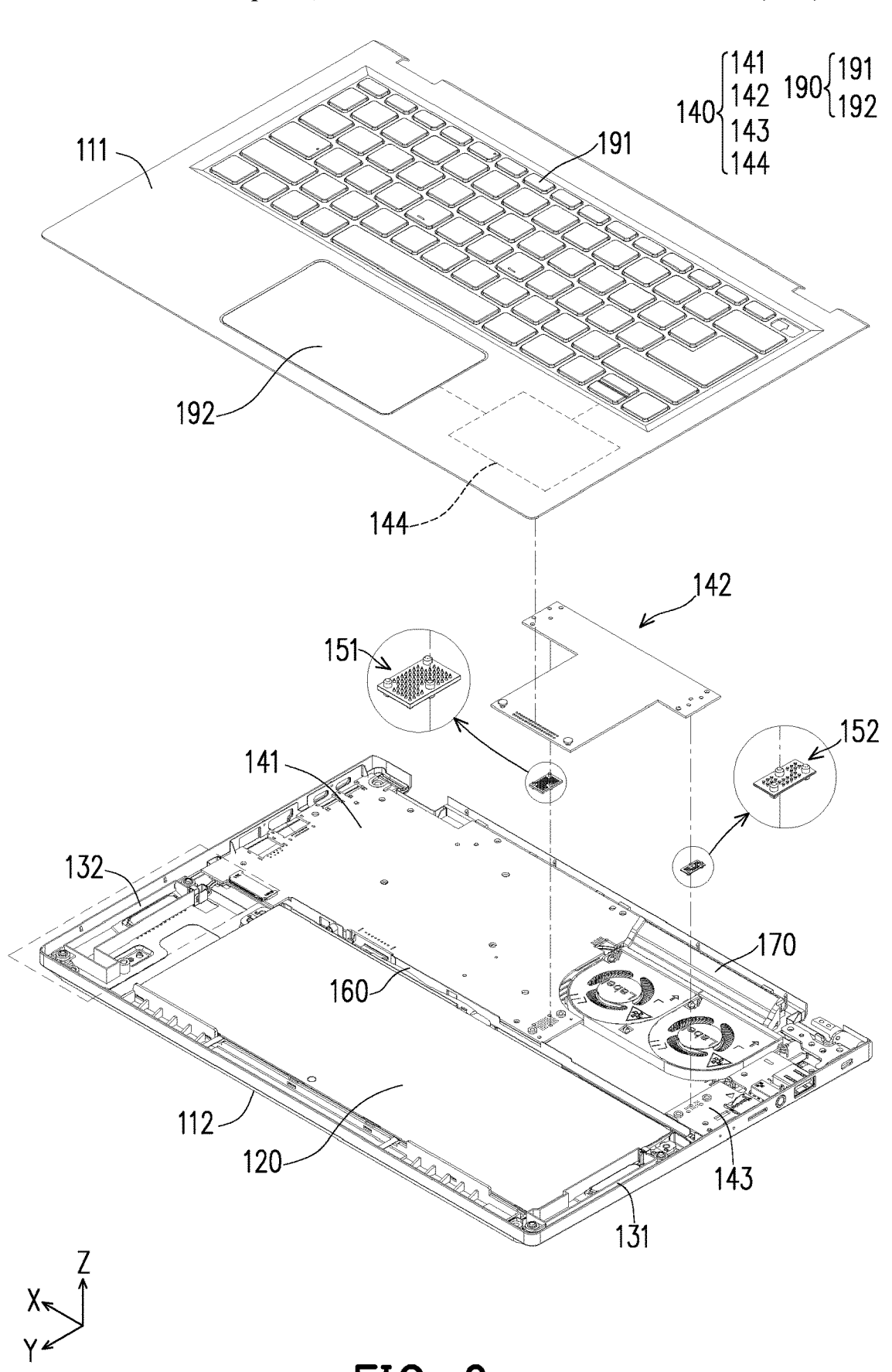
FIG. 2 is an exploded view of some members of a laptop computer.
Figure 3:
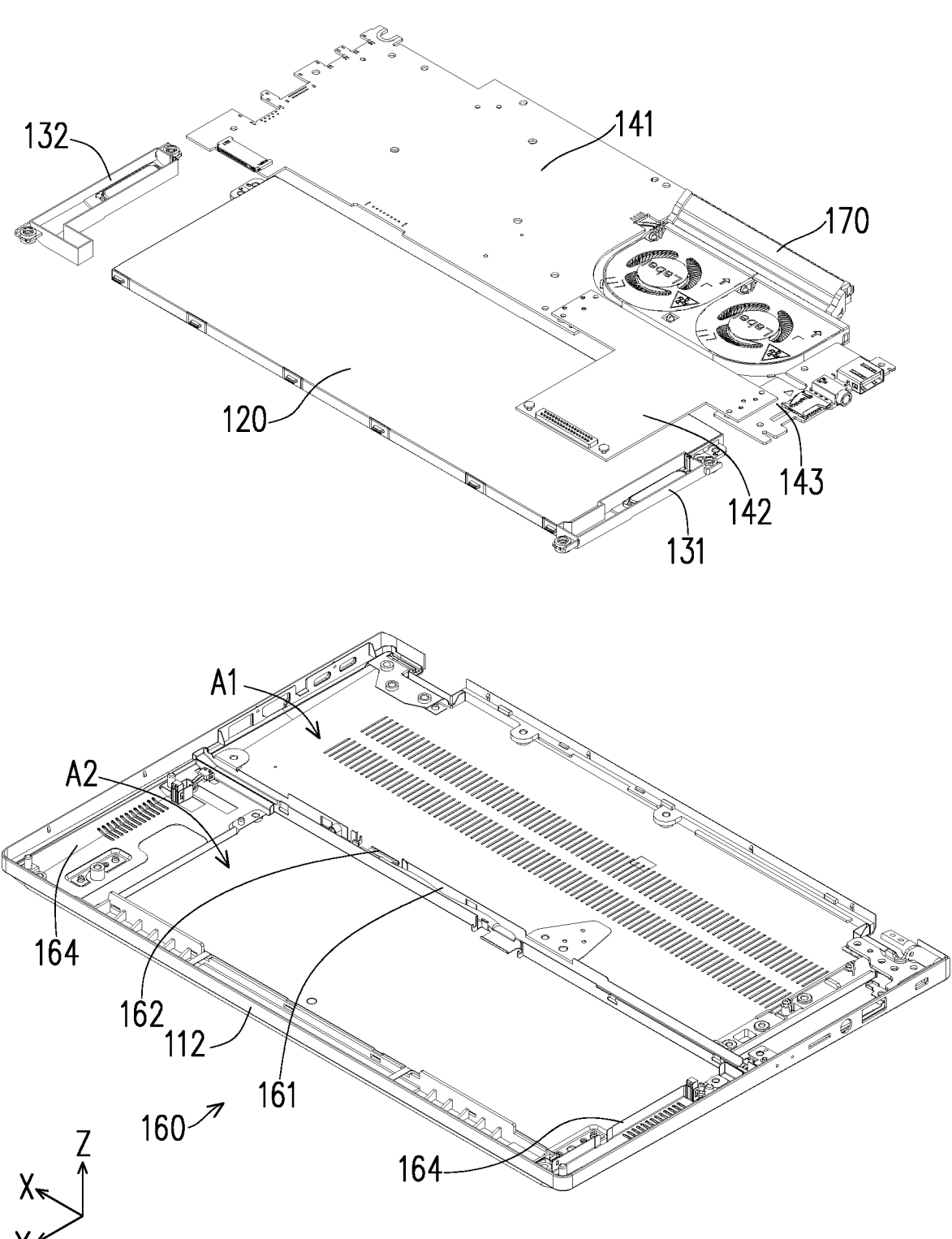
FIG. 3 is an exploded view of some members of FIG. 2.

FIG. 1 is a flowchart of a laptop computer according to an embodiment of the invention. FIG. 2 is an exploded view of some members of a laptop computer. The screen of the laptop computer is omitted here. FIG. 3 is an exploded view of some members of FIG. 2. At the same time, the present embodiment provides rectangular coordinates X-Y-Z to facilitate member description. Please refer to FIG. 1 to FIG. 3 simultaneously. In the present embodiment, a laptop computer 100 includes a casing 110, an inner frame 160, and a plurality of electronic modules. The casing 110 is where the system host of the laptop computer 100 is located to accommodate the inner frame 160 and the plurality of electronic modules. The casing 110 is further divided into an upper member 111 and a lower member 112. The electronic module includes an input module 190 formed by a keyboard 191 and a touch panel 192, and assembled at the upper member 111 of the casing 110. The inner frame 160 is assembled to the casing 110 and forms a plurality of receiving zones separated from each other (herein, a receiving zone one A1 and a receiving zone two A2 are taken as examples, but are not limited thereto). The electronic modules are respectively disposed in the receiving zone one A1 and the receiving zone two A2.

Figure 4:
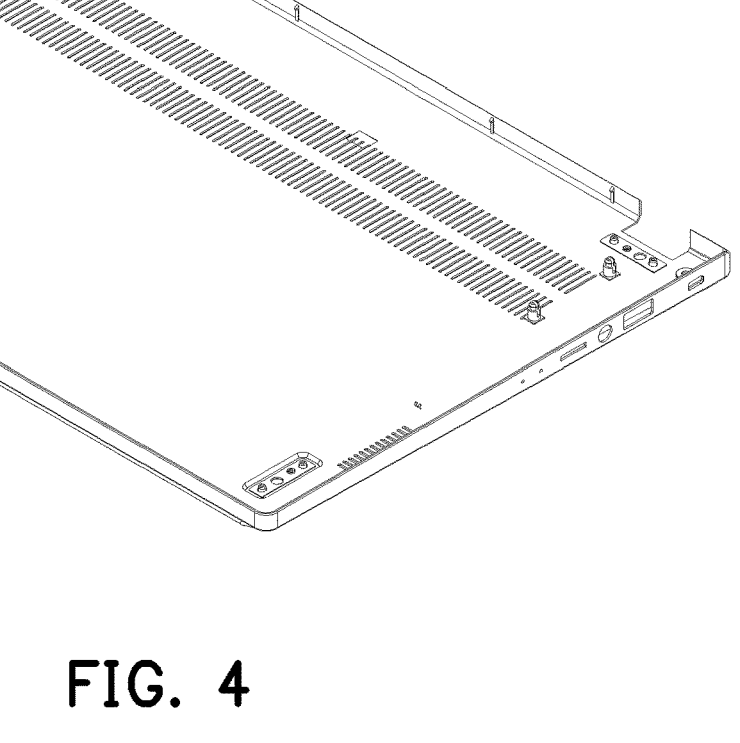
FIG. 4 is an exploded view of some members of FIG. 3.

FIG. 4 is an exploded view of some members of FIG. 3. Please refer to FIG. 2 to FIG. 4 at the same time. In the present embodiment, the receiving zone one A1 and the receiving zone two A2 are substantially located on the same plane (i.e., the X-Y plane), and are separated by the inner frame 160 so that they are separated from each other and do not belong to each other. Furthermore, in addition to the input module 190, the electronic modules also include: a battery module 120, speaker modules 131 and 132, a circuit board module 140, and a heat dissipation module 170, wherein the battery module 120 and the speaker modules 131 and 132 are disposed at the receiving zone two A2, and the speaker modules 131 and 132 are substantially located at two opposite sides of the battery module 120 along the X-axis. The circuit board module 140 includes a circuit board one 141, a circuit board two 142, a circuit board three 143, and a circuit board four 144, wherein the circuit board one 141 is, for example, the motherboard of the laptop computer 100 and disposed at the receiving zone one A1. The circuit board three 143 is used to carry a plurality of connectors and placed at the receiving zone one A1 together with the circuit board one 141 but separated from each other. The heat dissipation module 170 includes a heat pipe (not shown), a fan, and a heat dissipation fin disposed at the receiving zone one A1 and located between the circuit board one 141 and the circuit board three 143.

As shown in FIG. 2 and FIG. 3, the circuit board four 144 is disposed at the bottom surface of the upper member 111 of the casing 110 and electrically connected to the keyboard 191 and the touch panel 192, and the T-shaped circuit board two 142 serves as a bridge circuit board and is electrically connected between the circuit board one 141, the circuit board three 143, and the circuit board four 144 respectively via connectors 151, 152, and 153 via the three ends thereof. Here, the connectors 151 to 153 are, for example, board-to-board connectors, or pogo pin connectors and conductive contact pads that may be connected to each other, or connected and separated via conductive elastic pieces and conductive contact pads to facilitate electrical conduction via these connectors when the circuit boards are stacked (the circuit board two 142 is stacked with the circuit board one 141, the circuit board three 143, and the circuit board four 144 respectively). It should also be mentioned that the orthographic projection of the circuit board two 142 of the present embodiment at the lower member 112 spans the receiving zone one A1 and the receiving zone two A2, and a portion of the circuit board two 142 at the receiving zone two A2 is rested on the battery module 120. In this way, after the input module 190 is assembled to the upper member 111, and the battery module 120, the circuit board one 141, the circuit board three 143, and the heat dissipation module 170 are assembled to the lower member 112, via a process such as stacking the circuit board two 142 and assembling the upper member 111 and the lower member 112 along the Z-axis, at the same time that the members are assembled, the connectors 151 to 153 are also docked to complete the desired electrical connection between the four circuit boards. In other words, as shown in FIG. 2 and the configuration of the members, the operator may complete the structural and electrical connections at the same time by simply performing assembly operations in the Z-axis direction. Furthermore, the configuration adapted to the present embodiment is further suitable for automated assembly equipment due to the effective simplification of the assembly operation.

Figure 5A:
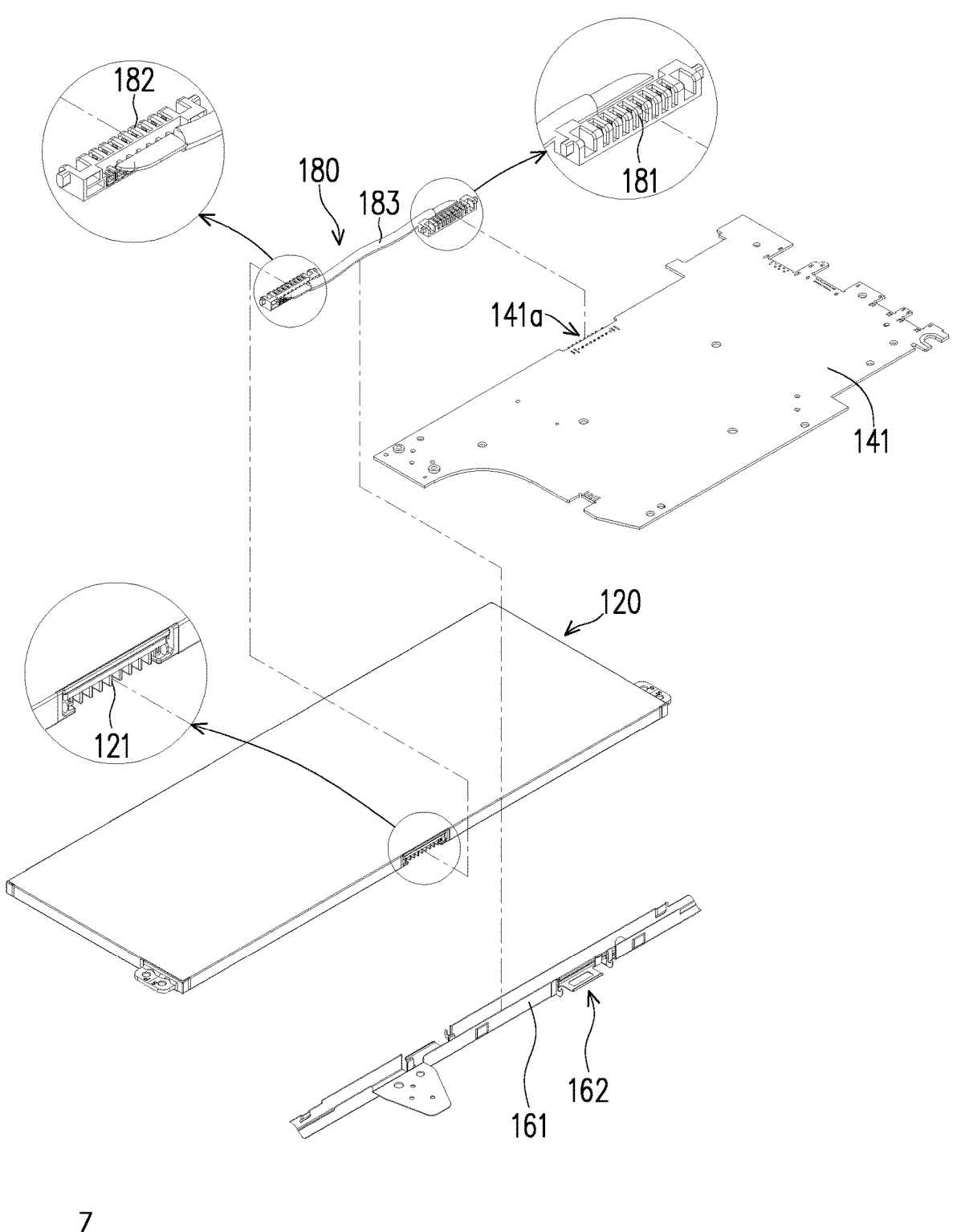
FIG. 5A shows a schematic assembly diagram of a circuit board one, a flexible electrical conducting member, a battery module, and a support beam.
Figure 5B:
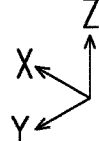
FIG. 5B shows the members of FIG. 5A from another perspective.

FIG. 5A shows a schematic assembly diagram of a circuit board one, a flexible electrical conducting member, a battery module, and a support beam. FIG. 5B shows the members of FIG. 5A from another perspective. Please refer to FIG. 5A and FIG. 5B at the same time, and compare with FIG. 3 or FIG. 4. In the present embodiment, the inner frame 160 is formed by welding a plurality of support beams. Further, in the present embodiment, a plurality of metal support beams (such as a support beam one 161, a support beam two 164, a support beam three 163, and a support beam four 165 shown in FIG. 4) are combined by laser welding to form the inner frame 160 as shown in FIG. 4. Next, the inner frame 160 and the lower member 112 of the casing 110 may be further locked together with locking accessories (such as screws, not shown here). In this way, the lower member 112 and the inner frame 160 remain in a detachable state, thereby providing the user with the convenience of replacing the casing 110 or the inner frame 160 as needed. For example, the appearance of the inner frame 160 shown in FIG. 4 is one embodiment of the invention. The user may select other suitable inner frames to be assembled to the lower member 112 of the casing 100 according to the configuration conditions of the electronic modules. It should also be mentioned that, as shown in FIG. 4, the inner frame 160 and the lower member 112 are also assembled together along the Z-axis direction. Therefore, as mentioned above, the inner frame 160 and the lower member 112 are also suitable for use in automated equipment due to a simplified assembly process.

Please refer to FIG. 5A and FIG. 5B again. The laptop computer 100 also includes an electrical conducting member 180 formed by a flexible cable one 183 electrically connected between a pair of connectors 181 and 182. Moreover, in the present embodiment, the cross-section of the support beam one 161 of the inner frame 160 is U-shaped (the opening faces the positive Z-axis direction) and has a recessed structure for receiving the electrical conducting member 180 to electrically connect the circuit board one 141 located in the receiving zone one A1 and the battery module 120 located in the receiving zone two A2 via the electrical conducting member 180. In the present embodiment, the circuit board one 141 has a connector 141*a* for electrically connecting to the connector 181 of the electrical conducting member 180, and the battery module 120 has a connector 121 for electrically connecting to the connector 182 of the electrical conducting member 180.

Figure 6A:
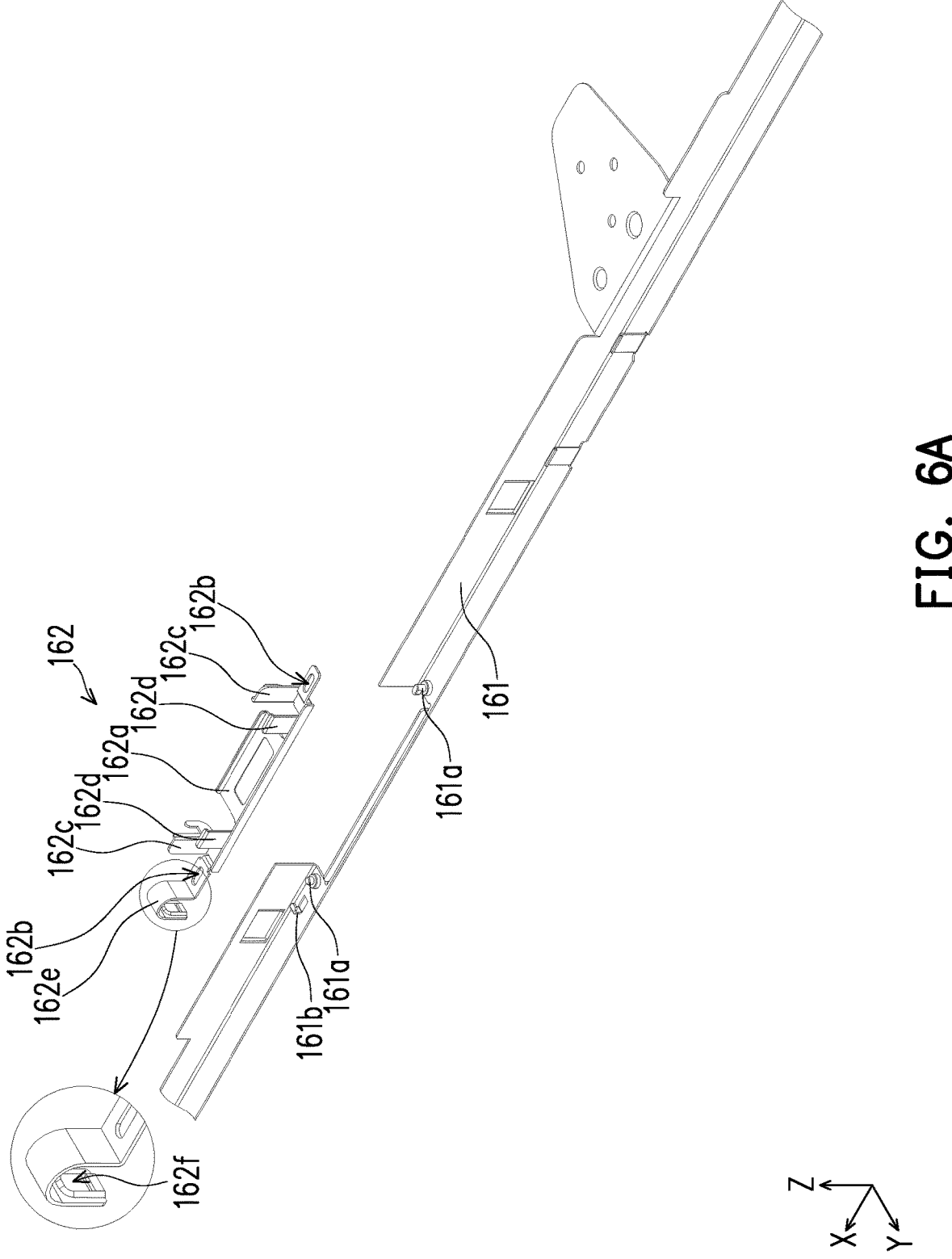
FIG. 6A shows a member exploded view of a support beam.
Figure 6B:
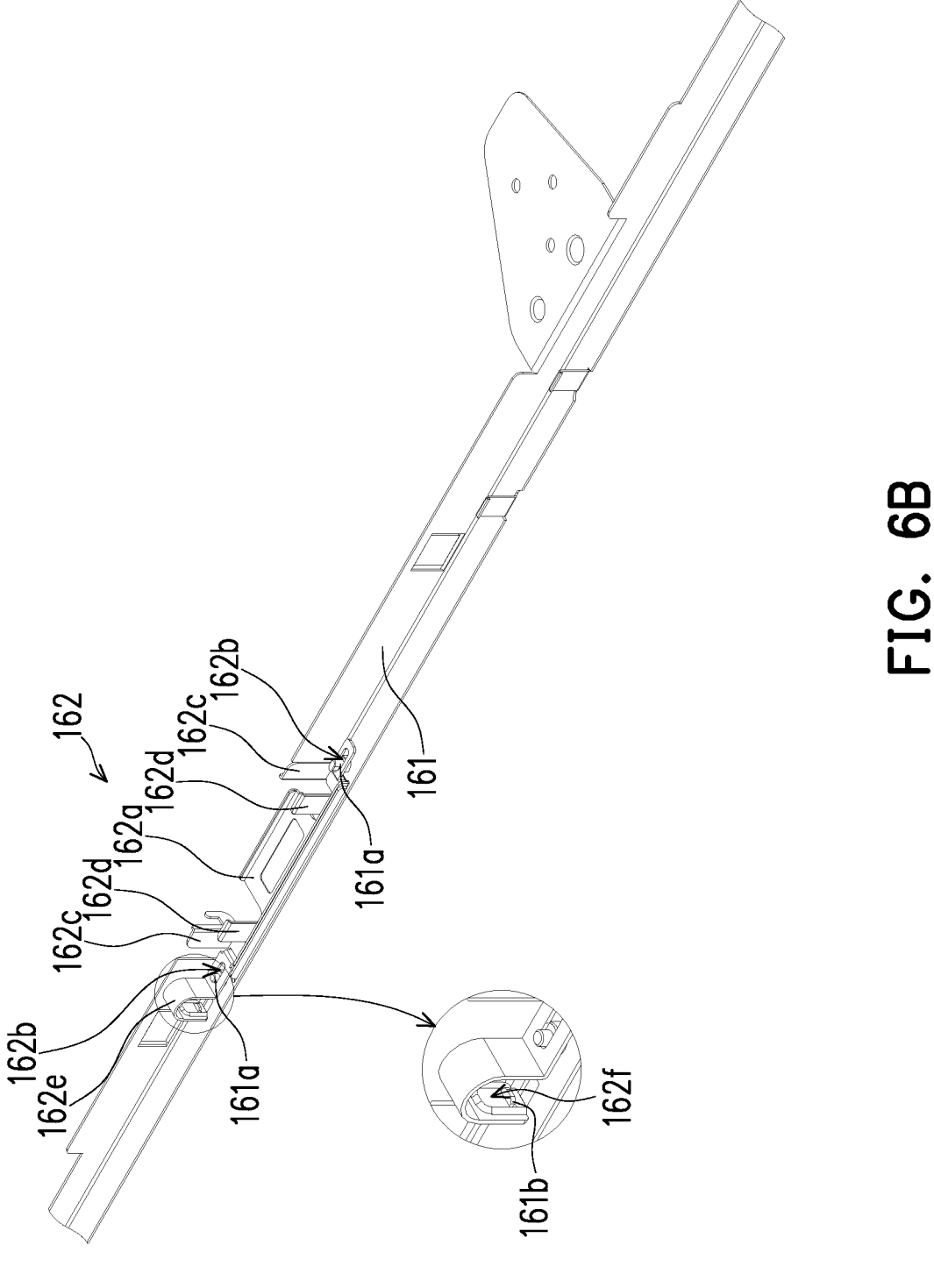
FIG. 6B shows a partial schematic diagram of a support beam.

FIG. 6A shows a member exploded view of a support beam. FIG. 6B shows a partial schematic diagram of a support beam. Please refer to FIG. 6A and FIG. 6B at the same time. In the present embodiment, the inner frame 160 also includes a moving member 162 slidably disposed on the support beam one 161 along the extending direction of the support beam one 161 (that is, the X-axis direction), and the connector 181 of the electrical conducting member 180 is disposed on the moving member 162, as shown in FIG. 5A. Here, the moving member 162 has a carrier 162*a*, a guide groove 162*b*, a stop 162*c*, a hook 162*d*, an arched elastic piece 162*e*, and a button hole 162*f*. Correspondingly, the support beam one 161 has a guide post 161*a* and a retaining portion 161*b*. By correspondingly coupling the guide groove 162*b* and the guide post 161*a*, the moving member 162 may slide relative to the support beam one 161 along the X-axis. During the assembly process of FIG. 6A to FIG. 6B, the guide post 161*a* is inserted into the guide groove 162*b*, and the retaining portion 161*b* (for example, a hook) is retained at the button hole 162*f* of the arched elastic piece 162*e*. That is, a side of the arched elastic piece 162*e* is constantly abutted against the retaining portion 161*b* of the support beam one 161, so as to be deformed under pressure when the moving member 162 is moved, as described later.

FIG. 7A to FIG. 7D show a flowchart of assembling a battery module and a circuit board one to an inner frame respectively. This is equivalent to assembling the inner frame 160 to the lower member 112 of the casing 110 and then continuing with the assembly process of the electronic modules. Please first refer to FIG. 7A and compare with FIGS. 5A and 5B. After the assembly of the inner frame 160 and the lower member 112 is completed, the electrical conducting member 180 may be assembled to the support beam one 161 of the inner frame 160, wherein the connector 181 is disposed at the moving member 162, and the cable one 183 is received in the recess structure. The connector 182 is located at another side of the support beam one 161 away from the connector 181. The connector 181 is actually carried at the carrier 162*a* of the moving member 162, and abutted between the stop 162*c* and the hook 162*d*, and retained by the hook 162*d*. After assembly, the connector 181 and the moving member 162 may be considered as one body and may be moved synchronously.

Figure 7A:
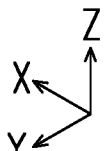
FIG. 7A to FIG. 7D show a flowchart of a battery module and the circuit board one being assembled into an inner frame respectively.

Next, as shown in FIG. 7A, the operator assembles the battery module 120 to the inner frame 160 and the lower member 112 along the Z-axis so that the battery module 120 is seated at the receiving zone two A2, and more importantly the connector 121 of the battery module 120 may be connected with the connector 182 of the electrical conducting member 180 during the assembly operation.

Figure 7B:
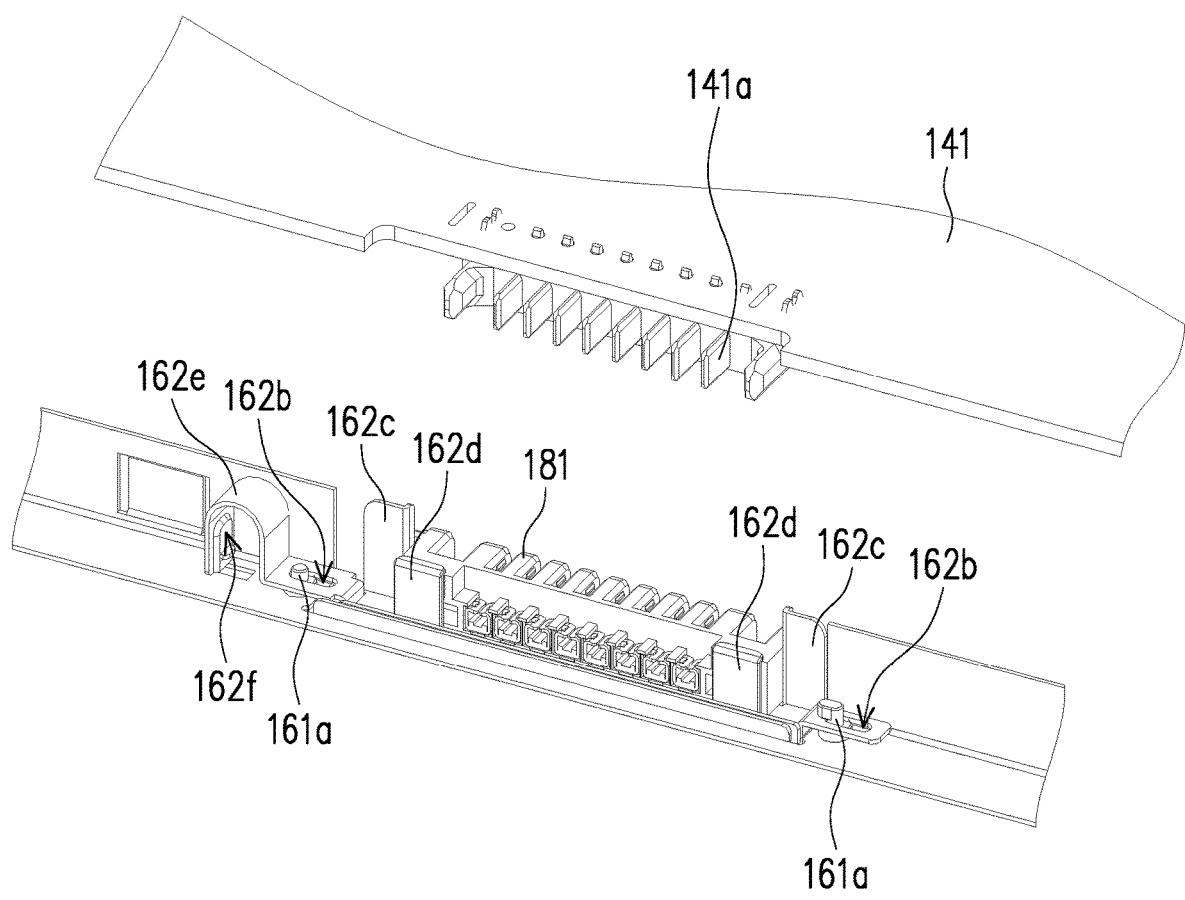
Figure 7B:
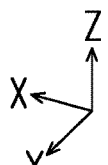
Figure 7C:
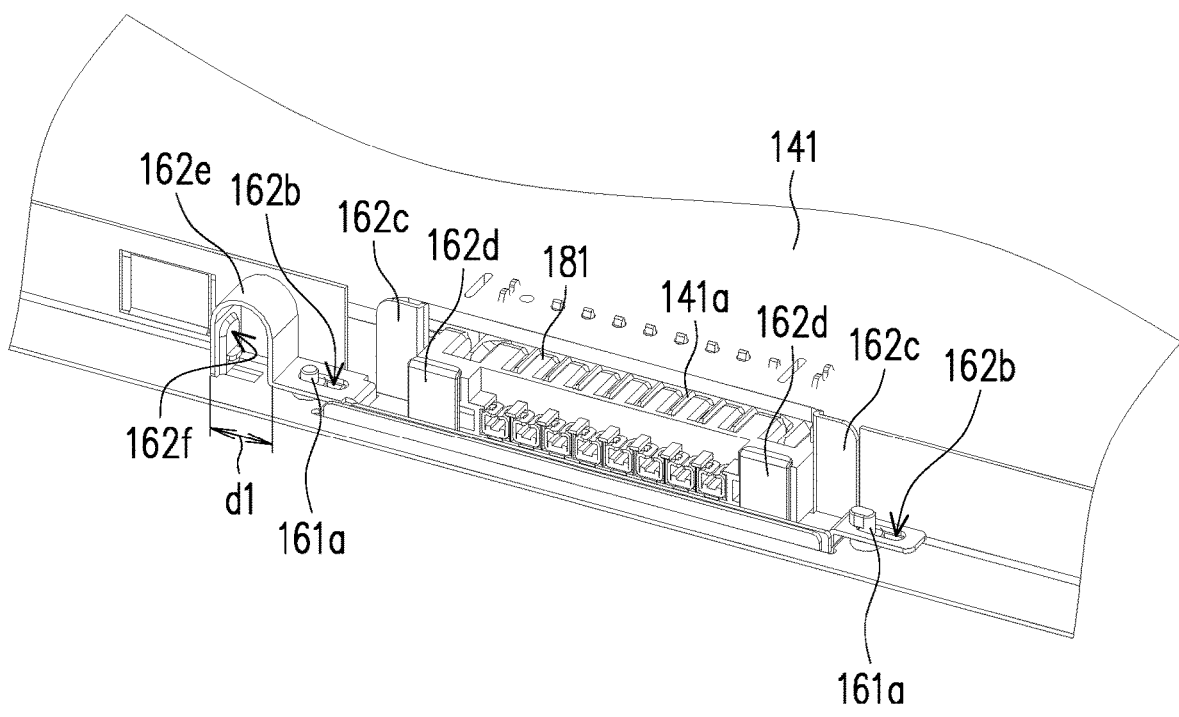
Figure 7C:
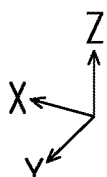

Next is the docking step of the circuit board one 141 and the connector 181. Please refer to FIG. 7B to FIG. 7D. First, the connector 141*a* of the circuit board one 141 is connected with the connector 181 of the electrical conducting member 180 along the Z-axis, as shown in FIG. 7B to FIG. 7C; then, the circuit board one 141 is driven to move in the positive X-axis direction. As mentioned above, since the connector 181 of the electrical conducting member 180 is disposed on the moving member 162, the moving member 162 is moved synchronously with the connected connectors 181 and 141*a*. At this point, the circuit board one 141 moved to the position may be successfully locked on the lower member 112 via a locking member (a screw, not shown here), as shown in FIG. 2.

Figure 7D:
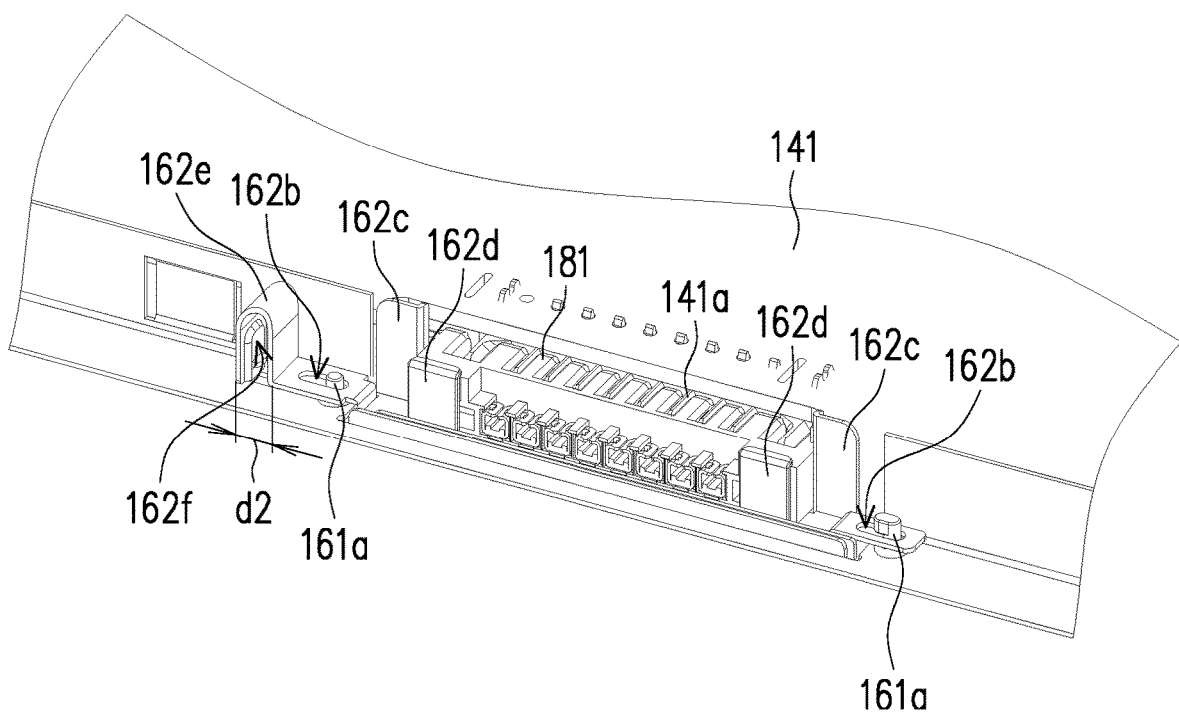
Figure 7D:
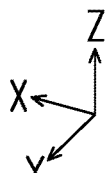
Figure 7E:
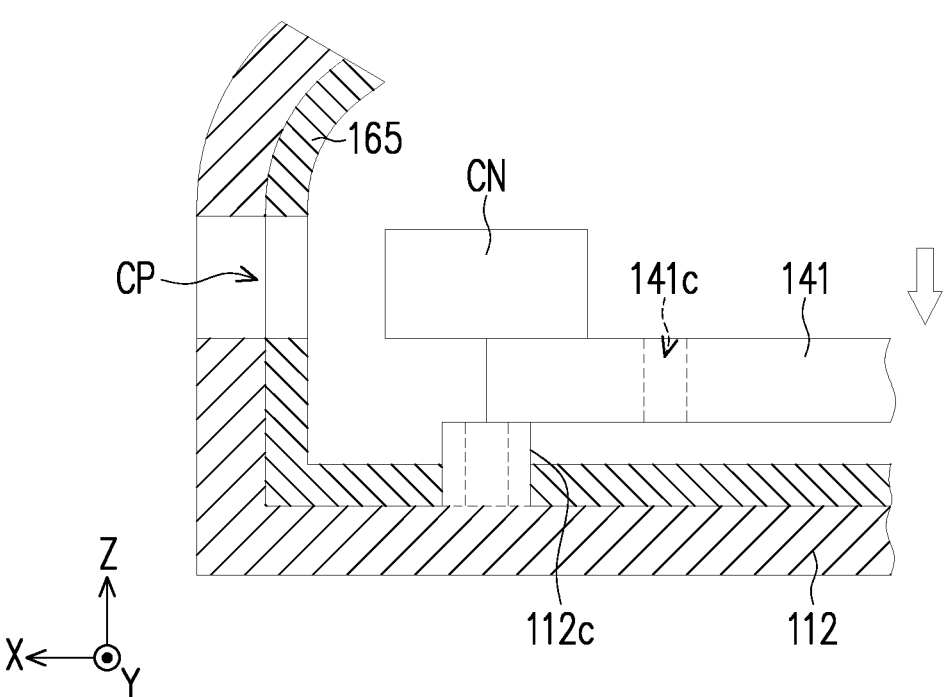
FIG. 7E and FIG. 7F show simple schematic diagrams of the circuit board one and surrounding structures.
Figure 7F:
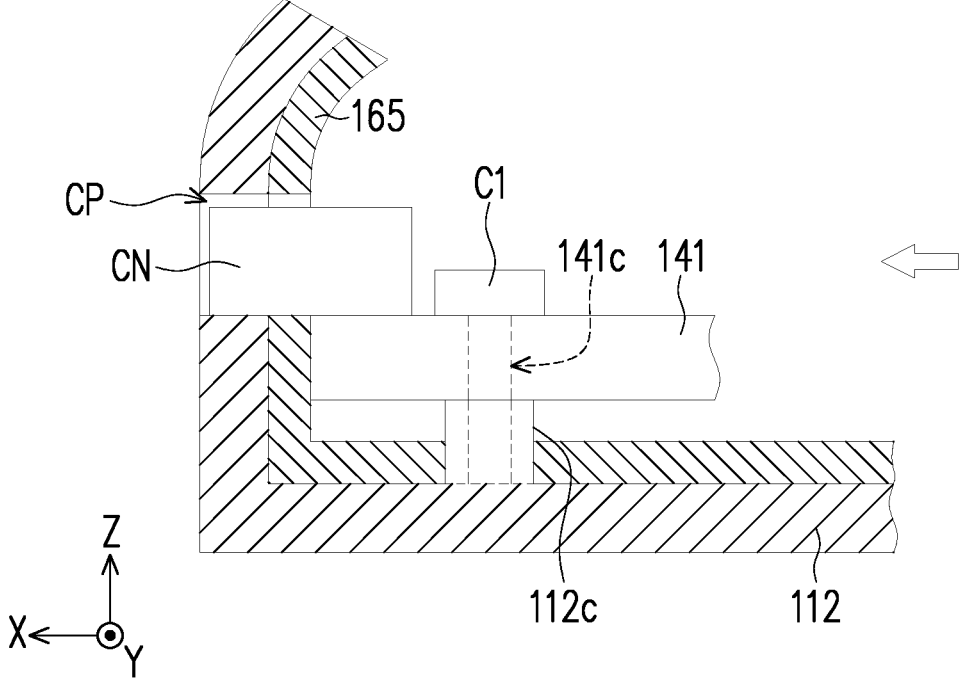

FIG. 7E and FIG. 7F show simple schematic diagrams of the circuit board one and surrounding structures. In the present embodiment, the reason that the aforementioned assembly steps of FIG. 7B to FIG. 7D are needed is that the circuit board one 141 also includes a connector CN. The structure of the inner frame 160 at the support beam four 165 is partially arcuate along the Z-axis, and the lower member 112 is also partially arcuate along the Z-axis at the contact point of the support beam four 165. In other words, if the circuit board one 141 is directly assembled to the inner frame 160 and the lower member 112 along the Z-axis, there is interference and collision between the connector CN and the support beam four 165 and even the lower member 112. Therefore, there is a significant risk of damaging the connector CN. Accordingly, the support beam one 161 and the moving member 162 are provided. In other words, performing the process of FIG. 7B to FIG. 7C is also equivalent to performing the process of FIG. 7E to ensure that the circuit board one 141 may be smoothly moved to the inner frame 160 and the lower member 112; then, the process of FIG. 7C to FIG. 7D is also equivalent to performing the process of FIG. 7E to FIG. 7F. By moving the circuit board one 141 in the positive X-axis direction, the connector CN may smoothly enter an opening CP of the inner frame 160 and the lower member 112; lastly, a locking member C1 passes through an opening 141*c* of the circuit board one 141 and is locked to the locking post 112*c* of the lower member 112 penetrating the inner frame 160, thereby fixing the circuit board one 141 to the inner frame 160 and the lower member 112. At the same time, the connector CN may also smoothly be abutted against the inner frame 160 and the lower member 112.

It should also be mentioned that, as mentioned above, the moving member 162 has an arched elastic piece 162*e*, so in the process of FIG. 7C to FIG. 7D, since the portion of the arched elastic piece 162*e* constantly held and abutted against the retaining portion 161*b* may be regarded as fixed, the arched elastic piece 162*e* shown in FIG. 7D is compressed and deformed due to the movement of the moving member 162. An opening distance d2 of the arched elastic piece 162*e* shown in FIG. 7D is less than an opening distance d1 of the arched elastic piece 162*e* shown in FIG. 7C, so that the arched elastic piece 162*e* may accumulate elastic force. At the same time, as the circuit board one 141 is locked and fixed with the inner frame 160 and the lower member 112 in the state shown in FIG. 7D, conversely, when the operator releases the locking and fixing, the elastic force of the arched elastic piece 162*e* may drive the moving member 162 to move in the negative X-axis direction and reset from FIG. 7D to FIG. 7C. This move also means that the connector CN is moved away from the opening CP (as shown in FIG. 7E), and the operator may move the circuit board one 141 away from the inner frame 160 and the lower member 112 in the positive Z-axis direction, that is, the steps of FIG. 7C to FIG. 7B.

It may be known from the disassembly and assembly process of the circuit board one 141, the inner frame 160, and the lower member 112 that the circuit board one 141 may successfully complete the structural and electrical connection or disconnection simply via the movement process in the Z-axis direction and the X-axis direction. Therefore, the disassembly and assembly process of the electronic module (the circuit board one 141) is effectively simplified, and at the same time facilitating completion via automated equipment.

Figure 8A:
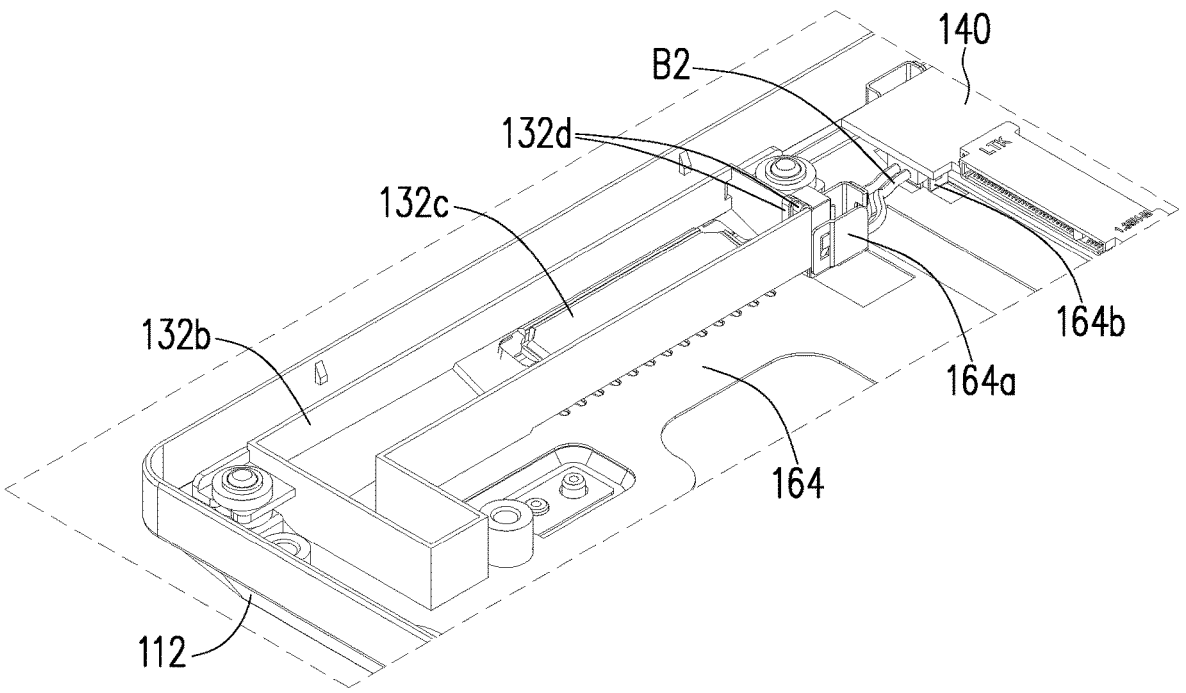
FIG. 8A is an enlarged view of a partial area of FIG. 2.
Figure 8B:
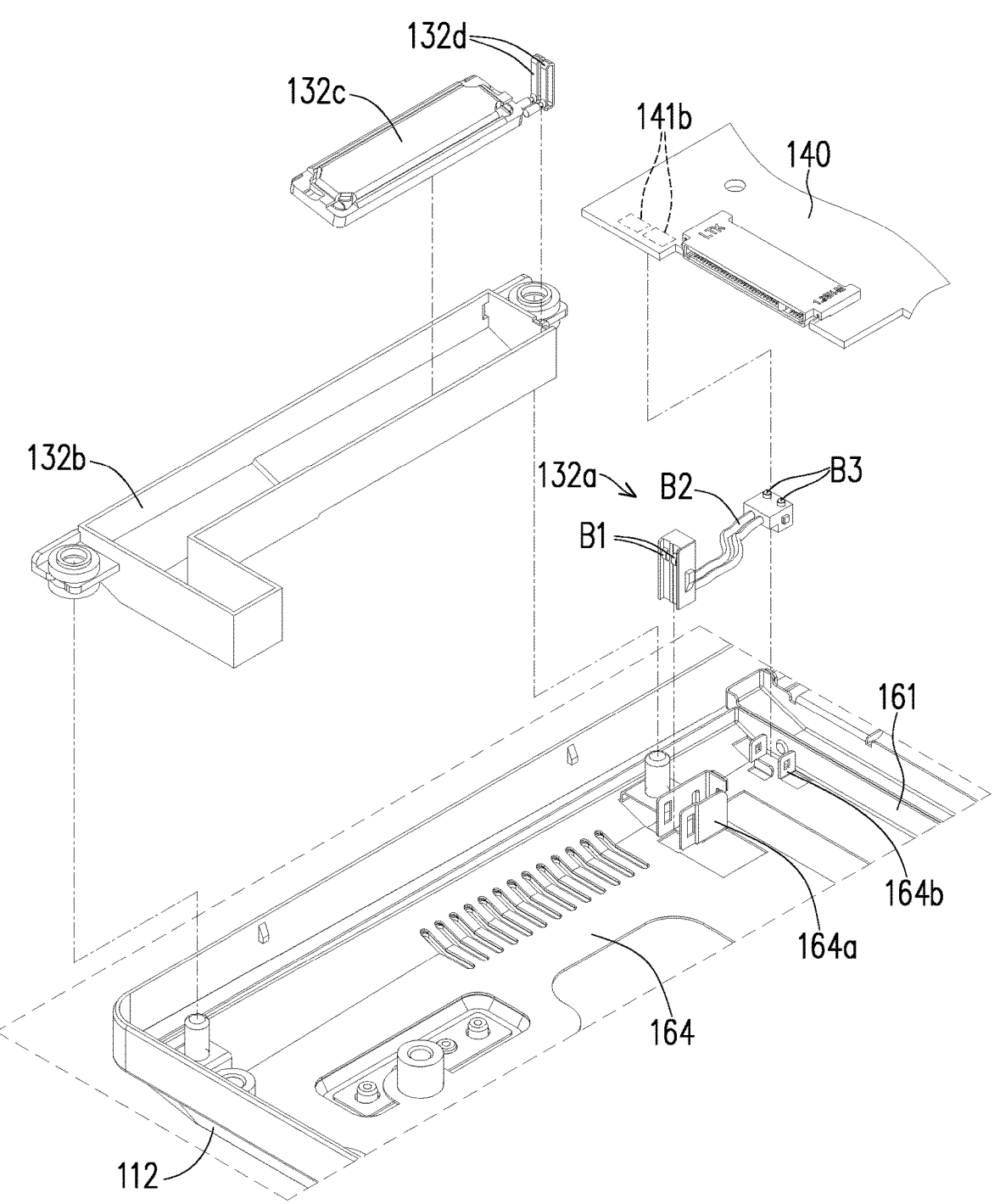
FIG. 8B is an exploded view of the relevant members of FIG. 8A.

FIG. 8A is an enlarged view of a partial area of FIG. 2. FIG. 8B is an exploded view of the relevant members of FIG. 8A. Please refer to FIG. 8A and FIG. 8B and compare with FIG. 3 or FIG. 4. In the present embodiment, the support beam two 164 of the inner frame 160 is adjacently connected between the first receiving zone one A1 and the second receiving zone A2 to form another receiving zone, and the speaker module 132 in the plurality of electronic modules is disposed on the support beam two 164. Furthermore, the speaker module 132 of the present embodiment also includes an electrical conducting member 132a, a holding tank 132b, a speaker unit 132c, and a connection terminal 132d. Correspondingly, the second support beam two 164 has support structures 164a and 164b. The holding tank 132b is disposed on the second support beam two 164, the speaker unit 132c is disposed in the holding tank 132b, and the connection terminal 132d is extended from the inner wall of the holding tank 132b to the outer wall of the holding tank 132b to be connected to the electrical conducting member 132a.

In the present embodiment, the electrical conducting member 132a includes an elastic piece protrusion B1, a cable two B2, and a pogo pin connector B3. The cable two B2 is electrically connected between the elastic piece protrusion B1 and the pogo pin connector B3. The electrical conducting member 132a is first assembled to the support structures 164a and 164b of the support beam two 164 in the connection relationship shown in FIG. 8B. Next, the speaker unit 132c and the connection terminal 132d are assembled into the holding tank 132b, and then assembled onto the support beam two 164. The above assembly steps all involve moving along the Z-axis, and at the same time, the connection terminal 132d is also abutted against the elastic piece protrusion B1. In other words, the connection terminal 132d extended to the outer wall of the holding tank 132b simultaneously completes structurally abutting against and electrically connecting to the elastic piece protrusion B1 during the assembly process.

Moreover, the circuit board one 141 assembled in the receiving zone one A1 also has a contact pad 141b corresponding to the pogo pin connector B3 of the electrical conducting member 132a. Therefore, during the assembly process of the circuit board one 141 (for example, FIG. 7B to FIG. 7D, or FIG. 7E to FIG. 7F), the contact pad 141b may be correspondingly abutted against the contact pad 141b. At this point, the speaker module 132 may be electrically connected to the circuit board one 141 via the electrical conducting member 132a.

Moreover, since the connection terminal 132d of the speaker module 132 is a bar-shaped terminal, the extending direction of the bar-shaped outline thereof is parallel to the Z-axis. When the speaker module 132 is assembled to the inner frame 160 and the lower member 112 and generates a relative movement of abutting against the elastic piece protrusion B1, the elastic piece protrusion B1 is constantly abutted against the connection terminal 132d. Therefore, it is ensured that the contact state of the elastic piece protrusion B1 with respect to the connection terminal 132d is not readily separated due to vibration. In other words, when the assembly of the electrical conducting member 132a is completed and during the assembly process of the speaker module 132, the elastic piece protrusion B1 is abutted against the lower portion of the connection terminal 132d, and as the connection terminal 132d is moved downward, the elastic piece protrusion B1 is gradually moved from the lower portion to the upper portion of the connection terminal 132d (and remain abutted against the connection terminal 132d), and after the movement of the connection terminal 132d is completed, the elastic piece protrusion B1 is constantly abutted against the upper portion of the connection terminal 132d.

Please refer to FIG. 2 to FIG. 4 again. The laptop computer 100 of the present embodiment also includes a speaker module 131 located at another side of the battery module 120, which like the speaker module 132, is also disposed on the inner frame 160, especially on the support beam two 164 of the indoor frame 160, and is also electrically connected via the electrical conducting member 131a. The only difference is that since the position of the speaker module 131 is located far away from the circuit board one 141, the speaker module 131 of the present embodiment is electrically connected to the circuit board three 143 via the electrical conducting member 131a, and then electrically connected to the circuit board one 141 via the circuit board two 142.

Based on the above, in an embodiment of the invention, the plurality of receiving zones may be formed in the laptop computer via the assembly and combination of the casing and the inner frame, and allow electronic modules to be assembled correspondingly in specific receiving zones to simplify the disassembly and assembly process. That is, the disassembly and assembly process of the laptop computer may be intuitive, which is conducive to the disassembly and assembly of the laptop computer by automated equipment or users.

Simply put, the receiving zones formed by the inner frame and the casing are substantially separated from each other, which is conducive to completing the electrical connection effect during the assembly process of the members, and thus avoiding the issue that the existing stacked assembly readily causes members to be overlapped with each other and connectors or locking members to be blocked and making smooth disassembly and assembly unlikely.

Furthermore, the inner frame has a recessed structure to facilitate the storage of flexible electrical conducting members and provide different electronic modules of different receiving zones to be electrically connected to each other via the electrical conducting members. In other words, in addition to the structural assembly and electrical assembly being completed at the same time, the laptop computer of the invention also uses the inner frame as an electrical connection channel for use by electronic modules of different receiving zones. Therefore, in addition to achieving the simplification and modularization of the above architecture, the architecture may also be effectively made more compact to facilitate the elimination of undesired redundant space.

What is claimed is:

1. A laptop computer, comprising: a casing; an inner frame detachably assembled to the casing and forming a plurality of receiving zones separated from each other; and a plurality of electronic modules respectively disposed in the receiving zones, wherein the electronic modules are electrically connected to each other via a plurality of flexible electrical conducting members, and the electrical conducting members pass through a recess structure of the inner frame, wherein a support beam one of the inner frame is divided between a receiving zone one and a receiving zone two of the receiving zones, the electronic modules comprise a battery module and a circuit board one, the battery module is disposed at the receiving zone two, the circuit board one is disposed at the receiving zone one, and the electrical conducting members are disposed at the support beam one to electrically connect the circuit board one and the battery module, wherein the electrical conducting members comprise a pair of connectors and a cable one, the cable one is electrically connected between the pair of connectors, the circuit board one is electrically connected to one of the pair of connectors, and the battery module is electrically connected to the other of the pair of connectors, and wherein the inner frame also comprises a moving member slidably disposed on the support beam one along an extending direction of the support beam one, and one of the pair of connectors is disposed on the moving member.

2. The laptop computer of claim 1, wherein the inner frame is formed by welding a plurality of support beams.

3. The laptop computer of claim 2, wherein a cross-section of the support beams is U-shaped to form the recess structure.

4. The laptop computer of claim 1, wherein the moving member has an arched elastic piece constantly abutted against a retaining portion of the support beam one, and the arched elastic piece is deformed as the moving member slides.

5. The laptop computer of claim 1, wherein a support beam two of the inner frame is adjacently connected between the receiving zone one and the receiving zone two of the plurality of receiving zones, the electronic modules comprise a speaker module and the circuit board one, the speaker module is disposed on the support beam two, the circuit board one is disposed at the receiving zone one, and the electrical conducting members are disposed at the support beam two to electrically connect the circuit board one and the speaker module.

6. The laptop computer of claim 5, wherein the electrical conducting members comprise an elastic piece protrusion, a cable two, and a pogo pin connector, the cable two is electrically connected between the elastic piece protrusion and the pogo pin connector, the circuit board one is electrically connected to the pogo pin connector, and the speaker module is electrically connected to the elastic piece protrusion.

7. The laptop computer of claim 6, wherein the speaker module has a bar-shaped terminal to be abutted against the elastic piece protrusion, and when the speaker module is assembled to the casing and generates a relative movement with the elastic piece protrusion, the elastic piece protrusion is constantly abutted against the bar-shaped terminal.

8. The laptop computer of claim 6, wherein the circuit board one has a contact pad to be pressed against the pogo pin connector.

9. The laptop computer of claim 1, wherein the inner frame is locked to a lower member of the casing to form the receiving zones.

10. The laptop computer of claim 1, wherein the electronic modules comprise the circuit board one, a circuit board two, and a circuit board three, the circuit board one and the circuit board three are disposed at the receiving zone one of the receiving zones and separated from each other, and the circuit board one and the circuit board three are electrically connected via the circuit board two.

11. The laptop computer of claim 10, further comprising an input module disposed at an upper member of the casing and electrically connected to the circuit board two.

12. The laptop computer of claim 10, wherein the electronic modules also comprise the battery module, a speaker module, and a heat dissipation module, the battery module and the speaker module are adjacent to each other and located at the receiving zone two of the receiving zones, and the heat dissipation module is disposed at the receiving zone one and located between the circuit board one and the circuit board three.

13. The laptop of claim 12, wherein an orthographic projection of the circuit board three at a lower member of the casing spans the receiving zone one and the receiving zone two, and a portion of the circuit board three at the receiving zone two rests on the battery module.

14. The laptop computer of claim 1, wherein the receiving zones are located at a same plane.

* * * * *